United States Patent
Kalinin et al.

(10) Patent No.: US 7,065,459 B2
(45) Date of Patent: Jun. 20, 2006

(54) INTERROGATION METHOD FOR PASSIVE SENSOR MONITORING SYSTEM

(75) Inventors: Victor Alexandrovich Kalinin, Headington (GB); John Peter Beckley, Bicester (GB); George E. Bown, Abingdon (GB)

(73) Assignee: Transense Technologies Plc (GB)

( * ) Notice: Subject to any disclaimer, the term of this patent is extended or adjusted under 35 U.S.C. 154(b) by 0 days.

(21) Appl. No.: 10/487,374

(22) PCT Filed: Aug. 23, 2002

(86) PCT No.: PCT/GB02/03895

§ 371 (c)(1),
(2), (4) Date: Feb. 20, 2004

(87) PCT Pub. No.: WO03/019461

PCT Pub. Date: Mar. 6, 2003

(65) Prior Publication Data

US 2004/0239504 A1    Dec. 2, 2004

(30) Foreign Application Priority Data

Aug. 23, 2001  (GB) .................. 0120571.5

(51) Int. Cl.
    *G01R 23/16* (2006.01)
(52) U.S. Cl. ..................... 702/77; 340/572.1
(58) Field of Classification Search ........... 340/540, 340/572.1, 572.2, 572.3, 572.4, 572.5, 10.1; 331/107 A, 154; 333/154, 195; 702/77; 342/42, 43

See application file for complete search history.

(56) References Cited

U.S. PATENT DOCUMENTS 3,737,911 A * 6/1973 Sakuragi et al. .......... 340/10.4

(Continued)

FOREIGN PATENT DOCUMENTS

EP    0 578 826 A1    1/1994

(Continued)

OTHER PUBLICATIONS

A. Pohl, G. Ostermayer and Franz Seifert; Wireless Sensing Using Oscillator Circuits Locked to Remote High-Q SAW Resonators; IEEE Transactions on Ultrasonics, Ferroelectrics, and Frequency Control, Sep. 1998,; pp. 1161-1168; vol. 45. No. 5.

*Primary Examiner*—Carol S. W. Tsai
(74) *Attorney, Agent, or Firm*—Keusey, Tutunjian & Bitetto, P.C.

(57) ABSTRACT

A method of determining the frequency of a plurality of resonant devices (for example three SAW devices) includes determining optimal interrogation frequencies for each of the devices, the optimal interrogation frequencies having maximum power spectral densities, accumulating a plurality of responses for each sensor, performing discrete Fourier transforms on the sampling results to estimate the three resonant frequencies, and averaging the results of the Fourier transforms to provide an indication of resonant frequencies. The averaging step may include the calculation of a standard deviation and the rejection of any results which fall more than a pre-determined multiple of the standard deviation from the average frequency result. The frequency determined by the method may be employed to calculate the pressure and temperature of the sensor devices. The sensor devices may be located in a vehicle tire.

20 Claims, 2 Drawing Sheets

U.S. PATENT DOCUMENTS

| | | | |
|---|---|---|---|
| 4,497,065 A * | 1/1985 | Tisdale et al. | 382/103 |
| 4,625,207 A * | 11/1986 | Skeie | 342/51 |
| 4,672,641 A | 6/1987 | Yen et al. | |
| 4,725,841 A * | 2/1988 | Nysen et al. | 342/44 |
| 4,794,395 A * | 12/1988 | Cindrich et al. | 342/424 |
| 5,019,815 A * | 5/1991 | Lemelson et al. | 340/933 |
| 5,119,070 A * | 6/1992 | Matsumoto et al. | 340/572.5 |
| 5,305,008 A * | 4/1994 | Turner et al. | 342/44 |
| 5,381,137 A * | 1/1995 | Ghaem et al. | 340/572.5 |
| 5,444,223 A * | 8/1995 | Blama | 235/435 |
| 5,691,698 A | 11/1997 | Scholl et al. | |
| 6,114,971 A * | 9/2000 | Nysen | 340/10.3 |
| 6,259,991 B1 * | 7/2001 | Nysen | 701/300 |
| 6,486,776 B1 * | 11/2002 | Pollack et al. | 340/521 |
| 6,617,962 B1 * | 9/2003 | Horwitz et al. | 340/10.4 |
| 6,633,226 B1 * | 10/2003 | Nysen | 340/10.1 |
| 6,765,476 B1 * | 7/2004 | Steele et al. | 340/10.4 |
| 2002/0019702 A1 * | 2/2002 | Nysen | 701/300 |
| 2002/0138199 A1 * | 9/2002 | Brodie | 701/213 |
| 2002/0158752 A1 * | 10/2002 | Steele et al. | 340/10.4 |
| 2004/0030496 A1 * | 2/2004 | Brodie | 701/213 |
| 2004/0085191 A1 * | 5/2004 | Horwitz et al. | 340/10.3 |
| 2004/0108904 A1 * | 6/2004 | Heide et al. | 331/16 |
| 2004/0203478 A1 * | 10/2004 | Scott | 455/70 |
| 2004/0211260 A1 * | 10/2004 | Girmonsky et al. | 73/579 |

FOREIGN PATENT DOCUMENTS

| | | |
|---|---|---|
| GB | 2 355 801 A | 5/2001 |

* cited by examiner

INTERROGATION METHOD FOR PASSIVE SENSOR MONITORING SYSTEM

TECHNICAL FIELD OF THE INVENTION

This invention relates to a method for interrogating sensor systems based on wirelessly interrogated passive sensory-transponders as used, for example, for measuring pressure and temperature of air in vehicle tires. More specifically, the preferred embodiment of the invention provides a passive sensor interrogation algorithm which allows high accuracy of measurement of pressure and temperature.

DESCRIPTION OF RELATED ART

A number of solutions for the problem of a wireless interrogation of passive pressure and temperature sensors are known in the prior art. The sensors utilize either one-port delay lines or one-port resonators, preferably based on SAW technology, although other approaches are also possible (bulk acoustic wave devices or dielectric resonators, for instance). The use of the delay lines [see F. Schmidt and G. Scholl, Wireless SAW identification and sensor systems. In a book "Advances in Surface Acoustic Wave Technology, Systems and Applications". Ed. C. W. C. Ruppel and T. A. Fjeldly, Singapore, World Scientific, 2001, p. 287.] or the resonators [see W. Buff, S. Klett, M. Rusko, J. Ehrenpfordt, and M. Goroll. Passive remote sensing for temperature and pressure using SAW resonator devices. IEEE Trans. On Ultrasonics, Ferroelectrics, and Frequency Control, vol. 45, No. 5, 1998, pp. 1388–1392.] is dictated by a necessity to distinguish a passive sensor response on the one hand and a direct feed-through signal together with environmental echo signals on the other hand. This is achieved by employing the fact that the impulse response of the delay lines and the resonators is considerably longer than any parasitic signal.

Interrogation of passive SAW sensors based on delay lines is usually performed by means of very short (typically, 0.1 µs) RF pulses. As a result, the interrogation system requires relatively wide bandwidth of 10 MHz or even more, which is not available in license-free industrial-scientific-medical (ISM) bands below 1 GHz. Sensors based on high Q-factor one-port resonators are more appropriate for these bands due to their narrowband response. For this reason, we shall concentrate on interrogation of resonator-type passive sensors, preferably based on SAW resonators. The main purpose of the interrogation is to measure the frequency of natural oscillations in the resonators (resonant frequencies) excited by relatively long and narrowband RF interrogation pulses. Since the resonant frequencies can be made to depend on temperature and pressure, knowing the resonant frequencies allows temperature and pressure to be calculated.

In order to exclude influence of varying antenna impedance on the resonant frequency the prior art [see W Buff, S. Klett, M, Rusko, J. Ehrenpfordt, and M. Goroll mentioned above] proposes that a difference between the frequencies of natural oscillations of two similar resonators (possibly with slightly different resonant frequencies) connected to one antenna, is measured. If both resonators are at the same temperature and have different pressure sensitivity, the pressure can be found from the frequency difference and the influence of temperature will be greatly reduced. The two resonators can be very efficiently interrogated by bi-harmonic RF pulse exciting natural oscillations in both resonators simultaneously [see GB9925538.2]. When the interrogation pulse is over the response will present an exponentially decaying beat signal with the beat frequency equal to the measured frequency difference. The beat frequency can be accurately determined by means of amplitude detection and period count.

In the case of simultaneous measurement of both pressure and temperature, at least three resonators connected to one antenna are required and two frequency differences need to be measured in order to calculate the two unknowns, the pressure and the temperature [see W. Buff, M. Rusko, M. Goroll, J. Ehrenpfordt, and T. Vandahl. Universal pressure and temperature SAW sensor for wireless applications. 1997 IEEE Ultrasonics Symp. Proceedings, 1997, pp. 359–362]. Measuring the beat frequency is impossible in this case. The following interrogation techniques are known from literature.

1. The resonators are excited by RF pulses in turn. The exponentially decaying response of each resonator is picked up by antenna is used as an input signal for a gated PLL tracking variations of the resonant frequency [see A. Pohl, G. Ostermayer, and F. Seifert. Wireless sensing using oscillator circuits locked to remote high-Q SAW resonator. IEEE Trans. On Ultrasonics, Ferroelectrics, and Frequency Control, vol. 45, No. 5, 1998, pp. 1161–1168]. This technique is more appropriate for a single resonator and becomes too cumbersome and unreliable in the case of three resonators, especially if their frequencies are close to each other.

2. The resonators are excited by RF pulses in turn. The exponentially decaying response of each resonator is picked up by antenna is down-converted to a lower intermediate frequency and then the period of the natural oscillation is counted [see GB9925538.2]. This method also works well either for a single resonator or when the distance between the resonant frequencies is much larger than the resonator bandwidth. However, if it is less than 10 times the bandwidth (which is the case in ISM band), then more than one resonator will be excited by the RF pulse causing parasitic frequency modulation in the sensor response and drastically reducing accuracy of measurement.

3. All three resonators are excited in one go. The spectrum of the sensor response is analyzed in the receiver by means of discrete Fourier transform and all resonant frequencies are measured [see L. Reindl, G. Scholl, T. Ostertag, H. Scherr, and F. Schmidt. Theory and application of passive SAW radio transponders as sensors. IEEE Trans. On Ultrasonics, Ferroelectrics, and Frequency Control, vol. 45, No. 5, 1998, pp. 1281–1291]. This approach allows interrogation of a large number of resonators. However it requires the use of a broadband RF pulse covering the whole frequency range of operation of the sensor. Bearing in mind that the peak power of the interrogation pulse is limited in ISM band (usually it is not more than 10 mW) it is clear that spreading the spectrum of the pulse reduces efficiency of resonator excitation. It adversely affects signal-to-noise ratio (SNR) and hence accuracy of measurements.

SUMMARY OF THE INVENTION

The object of the present invention is to provide an interrogation method that preserves the advantages of Fourier analysis and at the same time provides high efficiency of resonator excitation and high accuracy of measurements.

In accordance with one aspect of the present invention a method of interrogating a plurality of resonant devices to determine the respective resonant frequencies of the devices comprises the steps of:

(1) determining, for each resonant device, an optimal interrogation frequency;

(2) repeat the interrogation of each resonant device a plurality of times at its respective optimal interrogation frequency as determined by step (1)

(3) perform discrete Fourier transforms on the data accumulated as a result of step (2) and (4) determine the average of the frequencies derived from step (3).

The invention would be better understood from the following description of a preferred embodiment thereof, given by way of example only, reference being had to the accompanying drawings wherein:

DETAILED DESCRIPTION OF PREFERRED EMBODIMENTS

Figure 1:
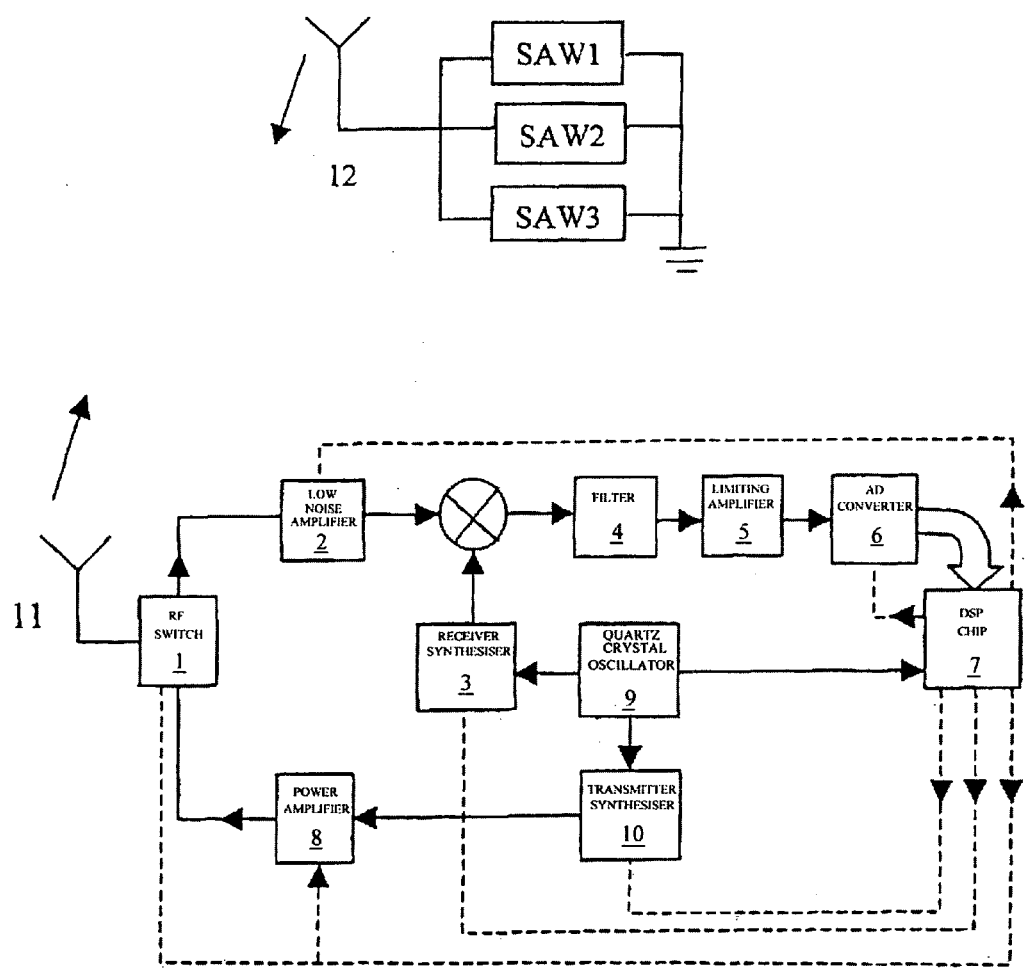
FIG. 1 illustrates schematically a pressure and temperature monitoring system for use in a vehicle tire.

Referring firstly to FIG. 1, the present invention is particularly applicable to a system for monitoring the temperature and pressure in a vehicle tire. However, it is to be understood that the invention is not limited to this application and may be applied to other circumstances where pressure and temperature are to be monitored, or indeed to other circumstances where a plurality of other perimeters are to be measured by a passive sensor system. The preferred embodiment of the present invention includes three surface acoustic wave devices SAW1, SAW2 and SAW3 which are connected to a common antenna 12. While the use of SAW devices is preferred as a means of generating signals indicative of the sensed condition, it is to be understood that the invention is not limited to such devices and other passive sensors capable of providing appropriate indications by means of resonant frequency may be employed.

In the particular preferred application of the present invention (vehicle tire pressure and temperature sensing) the SAW devices SAW1, SAW2, SAW3 and the antenna 12 are mounted as a unit A within a vehicle tire. An excitation and monitoring unit B is located on the vehicle in order to provide excitation signals to the tire mounted unit and to receive response signals from it. For this purpose, the unit B includes an antenna 11 for communicating with the antenna 12 of the package A.

An interrogation pulse is generated by a power amplifier 8 that is excited by a transmitter synthesiser 10. The pulse goes through an RF switch 1 to the antenna 11 of the interrogation unit B. The radiated electromagnetic wave is picked up by the antenna 12 of the sensor unit A thus exciting the three SAW resonators in the sensor. Re-radiated sensor response is transmitted by the sensor antenna and received by the antenna 11. The signal goes through a front-end low-noise amplifier 2 to the frequency converter where it is mixed with the signal of the receiver synthesizer 3. The frequency difference between the receiver synthesizer 3 and the transmitter synthesizer 10 equal to the intermediate frequency, e.g. 1 MHz. The IF signal goes through a filter 4 and a limiting amplifier (which increases the dynamic range of the receiver) to an 8-bit or 10-bit analog-to-digital converter 6 with the sampling rate sufficiently high in comparison with the IF, e.g. 10 or 20 MHz. The sensor response in digital format is stored in the internal memory of a DSP chip 7 where it is accumulated in a coherent way during the interrogation process. The chip then performs Fourier transformation of the data for all three SAW resonators, calculates three resonant frequencies, performs averaging procedure and calculates the pressure and the temperature. The DSP chip 7 also controls the operation of the synthesizers 3 and 10, RF switch 1, and the ADC 6. Besides, it can also enable and disable the power amplifier 8 and the LNA 2 in order to increase an isolation between the receiver and the transmitter. As one of the measures to ensure coherent accumulation of the sensor responses the same quartz crystal oscillator 9 is preferably used as a reference for both synthesizers and for the DSP chip.

The above system can also be implemented by using a double frequency conversion receiver that increases image channel rejection. An alternative receiver architecture can be based on a direct frequency conversion. This would cause the removal of one of the synthesizers and addition of the second mixer and ADC to produce a quadrature channel.

Figure 2:
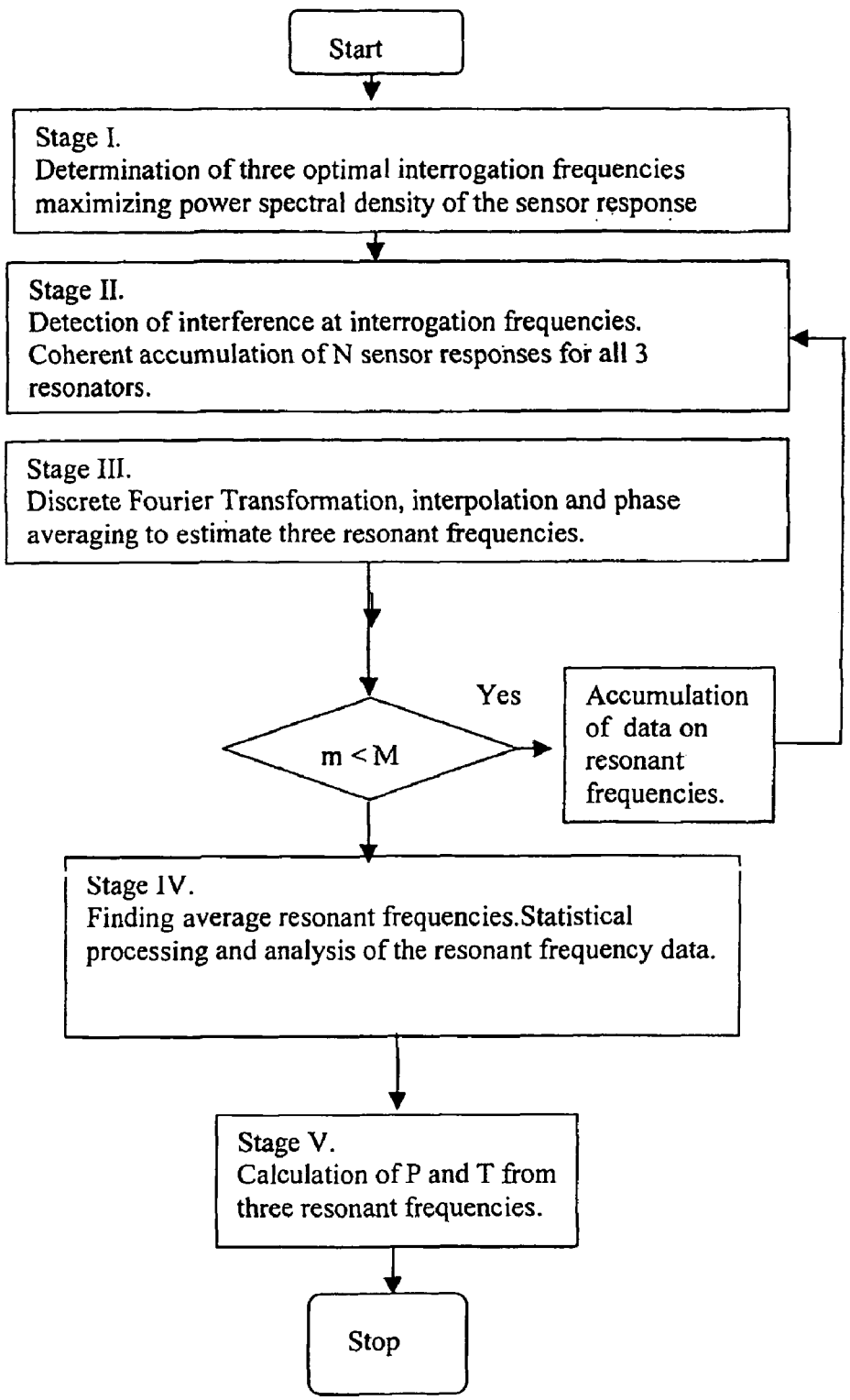
FIG. 2 illustrates the interrogation algorithm proposed by the present invention.

Referring now to FIG. 2, the preferred method of the present invention will be described. The three resonators SAW1, SAW2, SAW3 have slightly different resonant frequencies and different temperature and pressure sensitivities. The frequencies are chosen in such a way that the minimum distance between them is not less than the resonator bandwidth at any pressure and temperature. As a result, the whole operational frequency band (ISM band, for instance) is divided into three sub-bands occupied by the three resonators.

The sensor A is interrogated by rectangular RF pulses with the spectral width equal to or less than the resonator bandwidth. This ensures efficient excitation of the resonator in the case if the interrogation frequency is close to the resonant frequency of the resonator. In each sub-band, there are several discrete interrogation frequencies chosen in such a way that the distance between them is equal to or less then the bandwidth of the resonators. The number of the discrete interrogation frequencies depends on the Q-factor of the SAW resonators. For instance, in the case of the unloaded Q=5000 it would be enough to have nine interrogation frequencies within the 434 MHz ISM band.

As a result, whatever the temperature and pressure is, there will always exist three interrogation frequencies from the set of the chosen discrete frequencies that ensure optimal excitation of the three resonators. The excitation is optimal in the sense that the amplitude of oscillation in the resonator will be close to maximum possible one for a given excitation amplitude by the end of the interrogation pulse.

The interrogation procedure consists of five main stages as illustrated by the flowchart in FIG. 2.

1. Determination of the Three Optimal Interrogation Frequencies Maximizing Power Spectral Density of the Sensor Response.

At this stage, the sensor is interrogated at all discrete interrogation frequencies one after another. Each time, after launching the interrogation pulse, the sensor response is received and its spectral density is found. It can be done, for instance, by frequency down-conversion, sampling the response at the intermediate frequency and calculating discrete Fourier transform. After that, three optimal frequencies are chosen, one in each sub-band, giving maximum peak value of the spectral density. Alternatively, if a linear amplifier with automatic gain control is used in the receiver, the three frequencies can be chosen that maximize the ratio of the peak value of the spectral density to the average level of its sidelobes. Alternatively, if the limiting amplifier is used in the receiver, the three frequencies can be chosen that maximize the length of the sensor response.

At this stage we can already determine the three resonant frequencies by measuring the peak frequencies of the spectral density. However, this would give us just a rough estimate of the actual frequencies of natural oscillations because of the presence of noise and finite resolution of Fourier analysis.

2. Coherent Accumulation of Sensor Responses

At this stage we repeat interrogation of the sensor N times at each optimal interrogation frequency in turn. The signals picked up by the receiver are down-converted, sampled and accumulated in a coherent way in three data arrays in a system memory. The aim of the coherent accumulation is to increase SNR by a factor of N. Coherent accumulation can be ensured, for instance, by using a common quartz-stabilized oscillator both in receiver and transmitter synthesizers and as a clock generator in the DSP chip. In other words, the period of the interrogation signal at the intermediate frequency and the distance between the interrogation pulses are chosen to be an integer number of the sampling period. Besides, the number of accumulated pulses N is chosen to be sufficiently small (N=10 . . . 30) so that the total time needed for coherent accumulation (approximately 1 . . . 2 ms) is small enough (1/40, for instance) in comparison with the period of a vehicle tire rotation. As a result, a change in a position of the sensor antenna will not cause a large variation in the phase of the sensor response during accumulation. It is also important from the point of view of minimizing a variation of the frequency differences between the three resonators caused by the antenna impedance variation as a result of the tire rotation.

Before doing coherent accumulation the presence of interference is also checked at each of the three optimal interrogation frequencies. This can be done for instance by comparing maximum of the spectral density of the signal received in the absence of the interrogation pulse with an appropriate threshold level. If it exceeds the threshold level then the system repeats interrogation after some delay. A simpler interference detection procedure can also be used within the coherent accumulation cycle. In this case, the interference can be detected by measuring the peak value of the received signal during 1–2 μs before launching each interrogation pulse.

3. Discrete Fourier Transform and Interpolation

At this stage the three data arrays obtained as a result of the coherent accumulation are used to calculate three spectral densities by means of discrete Fourier transformation (DFT). Each spectrum contains a peak corresponding to the frequency response of a single resonator although there may be other peaks due to excitation of the two other resonators. However, the main peak has larger amplitude and smaller peaks are disregarded. The main peak frequency corresponds to the relevant frequency of the natural oscillation. Resolution of Fourier analysis $\Delta f$ is increased by zero filling so that the analysis time is increased, for instance, from 10–20 μs up to 0.1–0.2 ms giving $\Delta f$=5–10 kHz. This accuracy is not still sufficient for many applications.

Further increase in accuracy is achieved by using quadratic or higher-order interpolation in the vicinity of the peak frequency in order to accurately find the resonant frequency for each three resonators. As a result, the accuracy is no longer limited by the resolution of Fourier analysis but mainly by the system noise.

Apart from the random component of the frequency measurement error due to noise there is also a systematic component (bias) due to the finite length of the sensor response. The value of the bias depends on the initial phase angle of the sensor response pulse at the intermediate frequency and it can vary from one cycle of coherent accumulation to another one. It is impossible to predict it because the initial phase is determined by the distance between the unknown resonant frequency and the interrogation frequency. The following methods are used to reduce considerably the bias and hence increase the accuracy of the system.

a) Coherent accumulation is repeated twice at each interrogation frequency but an additional phase shift of 90° is introduced into the interrogation pulse during the second cycle of accumulation. Alternatively, the samples are taken with the delay $\tau=1/(4f_{int})$ where $f_{int}$ is the nominal intermediate frequency (the difference between the interrogation frequency and the frequency of the local oscillator) during the second cycle of accumulation. DFT and interpolation procedures are also performed twice and the average of the two resulting peak frequencies is found. This average frequency becomes much closer to the measured resonant frequency since the biases in the two peak frequencies have opposite signs and approximately equal absolute values and they cancel each other. A disadvantage of this method is that the overall time of measurement is doubled.

b) The second method does not require an increase of the time of measurement. Coherent accumulation is repeated once at each interrogation frequency. The sampling rate is chosen in such a way that the sampling interval $T_s$ corresponds to 90° phase shift at the nominal intermediate frequency divided by any integer. In other words, $T_s=\tau/n$ where n=1,2,3 . . . For instance, if $f_{int}=1$ MHz then Ts can be chosen to be equal to 0.05 μs since $\tau$=0.25 μs. The first DFT is performed for the samples starting from the first one and the second DFT is performed for samples starting from the n-th one. Effectively it means that we have a 90° phase shift between the two sets of samples. As a result of averaging of the two peak frequencies found by means of DFT and interpolation the value of the bias is considerably reduced. As an example, the maximum value of the bias is reduced from 1.69 kHz to 0.57 kHz for the minimum distance between the three resonant frequencies of 350 kHz.

4. Statistical processing and analysis of the resonant frequency data Stages 1 to 3 (or 2 and 3 only if the resonant frequency variation is slow and a frequent repetition of stage 1 is not required) are continuously repeated and the data on the three resonant frequencies are stored in three data arrays in the system memory. After M cycles of interrogation (M can vary in a wide range, for instance, from 10 To 300) average values $f_{1,2,3}$ and standard deviations $\sigma_{1,2,3}$ of each of the three resonant frequencies are calculated. As a result, the standard deviations of $f_{1,2,3}$ are further decreased in comparison with $\sigma_{1,2,3}$ approximately by a factor of M. Then all the frequencies $f_i$ in the relevant arrays not satisfying the condition $$|f_i - f_{1,2,3}| < k\sigma_{1,2,3}$$

(where k may have values from 1 to 3) are excluded from consideration and the average frequencies are re-calculated again. The last procedure is performed in order to exclude possible influence of interference and sudden decrease in the signal amplitude during coherent accumulation causing rough errors in the resonant frequencies. The standard deviations $\sigma_{1,2,3}$ can also be used as a measure of validity of the information about the resonant frequencies.

5. Calculation of Pressure and Temperature

After averaging two different frequencies are calculated and then the pressure and the temperature are found using, for instance, the approach described in Ref. [4].

The proposed interrogation method is aimed to achieve the accuracy of the resonant frequency measurement better than $5 \times 10^{-6}$. In the case of SAW resonators working in 434 MHz ISM band it should give the accuracy of pressure measurement better that 1 psi and the accuracy of temperature measurement better than 1° C.

The invention claimed is:

1. A method of interrogating a plurality of resonant devices to determine the respective resonant frequencies of the devices comprising the steps of:
   (1) determining, for each resonant device, an optimal interrogation frequency;
   (2) repeating the interrogation of each resonant device a plurality of times at its respective optimal interrogation frequency as determined by step (1);
   (3) performing spectrum estimations on the data accumulated as a result of step (2); and
   (4) determining the average of the frequencies derived from step (3).

2. The method according to claim 1 wherein step (4) further includes the steps of determining the standard deviation for each of the average frequencies determined; rejecting any frequencies which vary from the average frequency by more than a predetermined multiple of the standard deviation; and re-calculating the average frequency after exclusion of the rejected data.

3. The method according to claim 1, wherein the optimal interrogation frequencies are determined by establishing the frequencies at which the signals from the resonant devices have a maximum power spectral density.

4. The method according to claim 3, wherein the maximum power spectral density is determined by frequency down-conversion, sampling the response at an intermediate frequency, and calculating discrete Fourier transforms.

5. The method according to claim 3, wherein the maximum power spectral density is determined by means of a linear amplifier with automatic gain control, the optimal frequencies being chosen to maximize the ratio of peak value of the spectral density to average level of its side lobes.

6. The method according to claim 3, wherein the maximum power spectral density is determined by use of a limiting amplifier, the frequencies being chosen to maximize the length of sensor response.

7. The method according to claim 1, wherein the optimal interrogation frequencies lie within respective sub-bands of an ISM band.

8. The method according to claim 1, wherein during the repetition of step 2 of claim 1 each signal received is down-converted, sampled and accumulated to provide a coherent accumulation of optimal interrogation frequencies.

9. The method according to claim 8, wherein the coherent accumulation is achieved by using a common oscillator both in the receiver and transmitter synthesizers and a clock generator in a DPS chip.

10. The method according to claim 1, wherein the number of repetitive interrogations in step 2 and the speed at which such interrogations are conducted is such that the total interrogation period is small in comparison with the period of any cyclical movement of the sensors relative to the interrogation equipment.

11. The method according to claim 8, wherein each coherent accumulation is repeated at each interrogation frequency but with an additional phase shift of 90° introduced into the interrogation pulse during the second cycle of accumulation of the samples are taken with the delay during the second cycle of accumulation.

12. The method according to claim 4, wherein the sampling rate is chosen in such a way that the sampling interval corresponds to a 90° phase shift at the intermediate frequency divided by an integer.

13. The method according to claim 1, wherein the determined frequencies are used to calculate pressure and temperature.

14. The method according to claim 1, wherein the resonant devices are SAW devices.

15. The method according to claim 1, wherein step (3) includes performing discrete Fourier transforms of the signals obtained at step (2).

16. A method of interrogating a plurality of resonant devices to determine the respective resonant frequencies of the devices comprising the steps of:
   (1) determining, for each resonant device, an interrogation frequency;
   (2) repeating the interrogation of each resonant device a plurality of times at its respective interrogation frequency as determined by step (1);
   (3) performing spectrum estimations on the data accumulated as a result of step (2); and
   (4) determining the average of the frequencies derived from step (3).

17. The method according to claim 16, wherein step (4) further includes the steps of determining the standard deviation for each of the average frequencies determined; rejecting any frequencies which vary from the average frequency by more than a predetermined multiple of the standard deviation; and re-calculating the average frequency after exclusion of the rejected data.

18. The method according to claim 16, wherein the interrogation frequencies are determined by establishing the frequencies at which the signals from the resonant devices have a maximum power spectral density.

19. The method according to claim 18, wherein the maximum power spectral density is determined by frequency down-conversion, sampling the response at an intermediate frequency, and calculating discrete Fourier transforms.

20. The method according to claim 18, wherein the maximum power spectral density is determined by means of a linear amplifier with automatic gain control, the frequencies being chosen to maximize the ratio of peak value of the spectral density to average level of its side lobes.

* * * * *